United States Patent

Zhong

[11] Patent Number: 5,617,314
[45] Date of Patent: Apr. 1, 1997

[54] KANJI CONVERSATION RESULT AMENDING SYSTEM

[75] Inventor: Zhang Zhong, Kawasaki, Japan

[73] Assignee: Fujitsu Limited, Kawasaki, Japan

[21] Appl. No.: 302,977

[22] Filed: Sep. 12, 1994

[30] Foreign Application Priority Data

Oct. 19, 1993 [JP] Japan ..................... 5-260613

[51] Int. Cl.⁶ .................................................. G06F 17/24
[52] U.S. Cl. ......................... 395/803; 395/797; 395/792
[58] Field of Search ................ 364/419.02, 419.07, 364/419.08, 419.09, 419.1, 419.11, 419.14, 419.17; 341/28

[56] References Cited

U.S. PATENT DOCUMENTS 4,544,276  10/1985  Horodeck .
4,777,600  10/1988  Saito et al. .
5,222,160  6/1993  Sakai et al. .
5,276,616  1/1994  Kuga et al. .................. 364/419.08
5,321,801  6/1994  Ando ............................ 364/419.1
5,384,700  1/1995  Lim et al. ..................... 364/419.1

FOREIGN PATENT DOCUMENTS

59-208637A  11/1984  Japan .

Primary Examiner—Robert A. Weinhardt
Attorney, Agent, or Firm—Armstrong, Westerman, Hattori, McLeland & Naughton

[57] ABSTRACT

In a word processor for processing a Chinese character, a control symbol is generated for a Kanji conversion result of each Kanji conversion string, and the Kanji conversion string and its control symbol are displayed on a display device in a pair. When an amendment is required, a user enters a control symbol corresponding to a Kanji conversion string to be amended and a function key indicating the type of amendment.

11 Claims, 8 Drawing Sheets a) じゅうらいのぎじゅつせつめい
   (juraino gijutsu setsumei)
b) 従来の技術説明
   (juraino)(gijutsu)(setsumei)
c) 従来の技術説明
   (juraino)(gijutsu)(setsumei)
d) 従来の技術説明
   (juraino gijutsu setsumei)
e) 従来の技術説明
   (juraino gijutsu setsumei)
f) 従来のぎじゅつ説明
   (juraino gijutsu setsumei)
g) 従来のぎじゅつの説明
   (juraino)(gijutsuno)(setsumei)
h) 従来の技術の説明
   (juraino)(gijutsuno)(setsumei)
i) 従来の技術の説明
   (juraino gijutsuno setsumei)

(a)
(a-1) INPUTTING PHONETIC CHARACTERS ; shi fei ren
(a-2) ; s是非   r 人
(a-3) CONTROL SYMBOL "s" + FUNCTION KEY ; s是    f 廃人
     (DIVISION)
(b)
(b-1) INPUTTING PHONETIC CHARACTERS ; yuan lai shi
(b-2) KANJI CONVERSION ; y願   L来世
(b-3) CONTROL SYMBOL "y" + FUNCTION KEY ; y原来 s是
     (INTEGRATION)
(c)
(c-1) INPUTTING PHONETIC CHARACTERS ; da xue xue sheng
(c-2) KANJI CONVERSION ; d大学   x学生
(c-3) CONTROL SYMBOL "d" + FUNCTION KEY ; da xue  x学生
     (REWRITING)
(c-4) REWRITING ; da  x学生
(c-5) KANJI CONVERSION ; d 大学生
(d)
(d-1) INPUTTING PHONETIC CHARACTERS ; lian jie zhe
(d-2) KANJI CONVERSION ; l鏈接 z普
(d-3) CONTROL SYMBOL "l" + FUNCTION KEY ; l聯接 z普
     (NEXT CANDIDATE)

| | | |
|---|---|---|
| a) | INPUT OF PHONETIC CHARACTERS | ; じゅうらいのぎじゅつせつめい<br>(juraino gijutsu setsumei) |
| b) | KANJI CONVERSION | ; ｊ 従来の ｇ 技術 ｓ 説明<br>(juraino) (gijutsu) (setsumei) |
| c) | CONTROL SYMBOL "g" + FUNCTION KEY<br>(REWRITING) | ; ｊ 従来の ぎじゅつ ｓ 説明<br>(juraino) (gijutsu) (setsumei) |
| d) | REWRITING | ; ｊ 従来の ぎじゅつの ｓ 説明<br>(juraino) (gijutsuno) (setsumei) |
| e) | KANJI CONVERSION | ; ｊ 従来の ｇ 技術の ｓ 説明<br>(juraino) (gijutsuno) (setsumei) |

KANJI CONVERSATION RESULT AMENDING SYSTEM

BACKGROUND OF THE INVENTION

1. Field of the Invention

The present invention relates to a Kanji conversion result amending system (where Kanji is a Chinese character) for use in a word-processor capable of processing Kanji, and more specifically to a Kanji conversion result amending system for efficiently inputting through keys characters in a multiple-word conversion method. The characters can be efficiently input by reducing the number of key presses required for a correct sentence.

2. Description of the Prior Art

Recently, information processing devices for processing 2-byte characters in Japanese, Chinese, etc. have become popular and brought remarkable progress to information processing industries. Based on this background, is required a method of efficiently producing words containing 2-byte characters such as Kanji.

In conventional Japanese word-processors, phonetic characters are input to be converted into Kanji. That is, "*1" (kanji) is input followed by a conversion key for converting the input phonetic characters into corresponding Kanji. Hereinafter, the characters enclosed by a pair of parentheses indicate the pronunciation of the preceded Japanese word(s). Then, candidate Kanji such as "漢字" (kanji) and "幹事" (kanji) corresponding to the input phonetic characters are displayed on the screen. A desired Kanji is selected from among displayed Kanji group which are identically pronounced but have different meanings such as "漢字" (kanji) and "幹事" (kanji) by pressing the conversion key once or repeatedly to display the next candidate group or select one of a plurality of candidates.

On the other hand, there are some Kanji conversion methods such as a 1-word conversion method for converting input characters in word units, for example, "ぎじゅつ" (gijutsu) into "技術" (gijutsu); a two-word conversion method for converting input characters in two-word units, for example, "ぎじゅつを" (gijutsu wo) into "技術を" (gijutsu wo); and a multiple-word conversion method for converting input characters in multiple-word units, for example, "ぎじゅつをつをせつめいする" (gijutsu wo setsumei suru) into "技術を説明する" (gijutsu wo setsumei suru). Among these method, the multiple-word conversion method is the most popular at present.

Converted words need amendments frequently while being input through keys. Described below is a conventional amending operation performed during a multiple-word conversion process.

Figure 1:
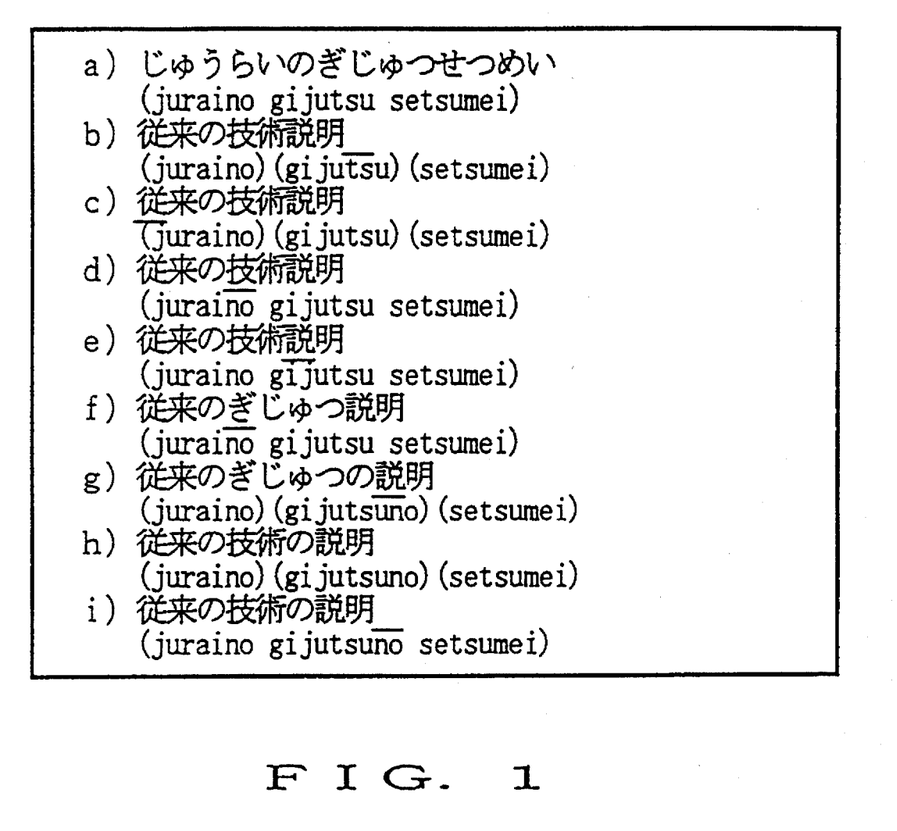
FIG. 1 shows a conventional method of amending a Kanji conversion result.

FIG. 1 shows a conventional Kanji conversion result amending method.

For example, a user first enters "じゅうらいのぎじゅつせつめい" (jurainogijutsusetsumei) in phonetic characters and they are converted in a multiple-word unit. Then, the user inputs "の" (no) between "技術" (gijutsu) and "説明" (setsumei). In FIG. 1, "_" indicates the position of the cursor.

As shown in a) of FIG. 1, the user enters the phonetic characters "じゅうらいのぎじゅつせつめい" (jurainogijutsusetsumei) followed by the conversion key. As a result, "従来の技術説明" (juraino gijutsu setsumei) is obtained in a mixed form of Kanji and phonetic characters as shown in b) of FIG. 1. At this time, the cursor is preceded by "従来の技術説明" (juraino gijutsu setsumei).

If the user wants to input "の" (no) between "技術" (gijutsu) and "説明" (setsumei), he or she first presses the cancel key to return the cursor back to its initial position shown in c) of FIG. 1. Then, the user presses the tab key to position the cursor at the next word shown in d) of FIG. 1. Thus, "従来の" (juraino) can be amended. Then the user presses the tab key again to position the cursor at the next word shown in e) of FIG. 1. Now, "技術" (gijutsu) can be amended.

Next, the user presses the cancel key to display the phonetic characters "ぎじゅつ" (gijutsu) shown in f) of FIG. 1. The cursor is positioned at "ぎ" (gi). Then, the user presses the cursor key to position the cursor at "説" (setsu), presses the insert key to input "の" (no) shown in g) of FIG. 1, presses the convert key to convert "ぎじゅつの" (gijutsuno) into Kanji shown in h) of FIG. 1, positions the cursor at the end of the processed words using the tab key shown in i) of FIG. 1 to end the amendment to the words.

In the above described conventional method, the delete, tab, cursor, and insert keys are pressed 9 times totally to insert "の" (no) between "従来" (jurai) and "技術説明" (gijutsusetsumei) as shown in c) through i) in FIG. 1. Among the nine times of the key presses, four presses are required to specify amendment objects.

On the other hand, if "技術" (gijutsu) in "従来の技術説明" (jurai no gijutsu setsumei) should be changed to "内容" (naiyo), then the insert key and the cursor key do not have to be pressed because "ぎじゅつ" (gijutsu) and "ないよう" (naiyo) are the same in the number of characters. Accordingly, there is no need to press the insert key and the cursor key, thereby reducing the total number of function key presses to seven. However, this is a case where a required amendment is very simple. Therefore, if the number of original pronunciation characters is different from that of the correction, then some function keys should be used a few more times.

However, in the conventional method, function keys and cursor positioning keys should be pressed many times to amend a Kanji conversion result, thereby increasing the number of key presses and taking a longer time for inputting data.

That is, when words are amended after they are converted into Kanji, function keys must be pressed a plurality of times to specify an amendment object. Then, the function keys and the cursor positioning key must be pressed a few times to enter amendments. Furthermore, the function keys should be pressed for a few more times to position the cursor at the next input position. Therefore, such a large number of key presses slows down the entire input process.

SUMMARY OF THE INVENTION

The present invention aims to efficiently amend a Kanji conversion result and complete an inputting operation by simply specifying a Kanji conversion string to be amended.

The present invention is based on a Kanji converting unit for converting input characters into Kanji using a dictionary/grammar data base; a document storage unit for storing a conversion result; and a display unit. It further comprises a control symbol adding unit for generating as a control symbol a characteristic representing each Kanji conversion string, for example, an initial sound or an accented phonetic character, and a parts name of a Kanji character of a Kanji conversion string; a control symbol storage unit for storing a generated control symbol; a display control unit for displaying a Kanji conversion result and a control symbol in a pair; an amendment input unit for inputting a Kanji conversion string to be amended and an amendment by entering a control symbol and a function key indicating the type of amendment; and an amending unit for determining a Kanji conversion string to be amended in response to an amendment and instructing the Kanji converting unit to amend a Kanji conversion result according to the type of amendment. With the above described configuration, a Kanji conversion string to be amended can be specified during an amending operation by a control symbol indicating the Kanji conversion string to be amended and a function key indicating the type of amendment. Accordingly, the number of presses of necessary keys can be reduced, thereby speeding up the amending operation and the entire input process.

A feature of the present invention resides in a Kanji (Japanese characters) conversion result amending system comprising Kanji converting unit for converting phonetic characters sequentially input for a plurality of Kanji conversion strings into Kanji using a dictionary/grammar data base, storing converted Kanji in document storage unit, and displaying the converted Kanji on a display unit, control symbol adding unit for generating a control symbol representing a Kanji conversion string control symbol storage unit for storing the control symbol generated by the control symbol adding unit in an order of storing a Kanji conversion result in the document storage unit, amendment input unit for specifying a Kanji conversion string to be amended using the control symbol when the Kanji conversion string requires an amendment and amending unit for amending the Kanji conversion string to be amended and specified by the amendment input unit.

BRIEF DESCRIPTION OF THE DRAWINGS

One skilled in the art can easily understand additional features and objects of this invention from the description of the preferred embodiments and some of the attached drawings. In the drawings.

DESCRIPTION OF THE PREFERRED EMBODIMENTS

Figure 2:
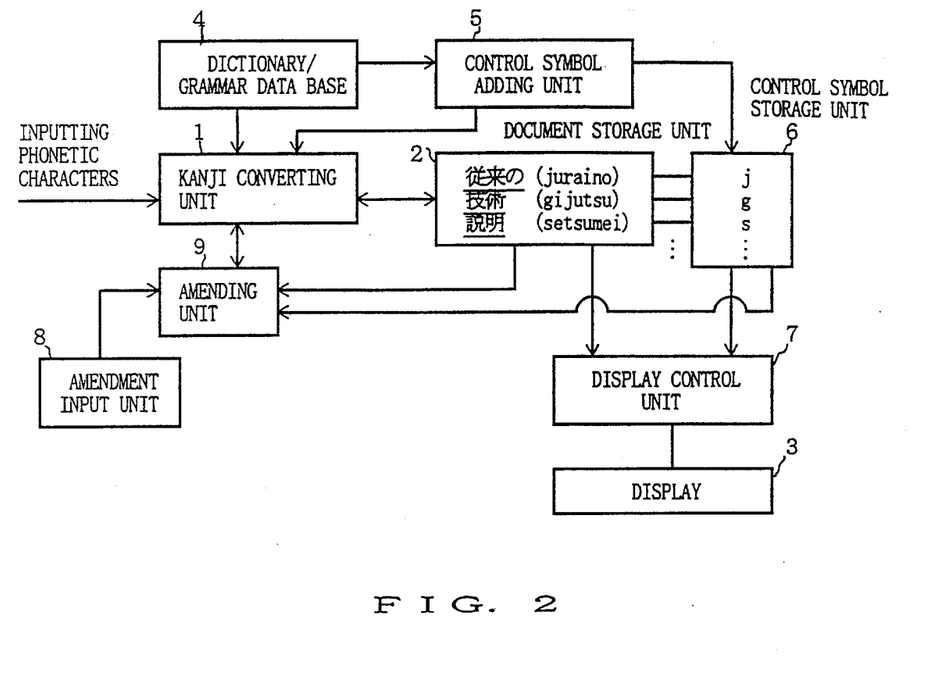
FIG. 2 is the block diagram showing the function of the present invention.

FIG. 2 is the block diagram showing the function of the present invention. The present invention is based on a dictionary/grammar data base 4 which accumulates a dictionary and a grammar for use in converting input phonetic characters to Kanji, a Kanji converting unit 1 for converting input data into Kanji using the dictionary/grammar data base 4, a document storage unit 2 for storing Kanji conversion results in Kanji conversion strings, and a display 3 for displaying the words stored in the document storage unit 3.

A control symbol adding unit 5 generates a control symbol for each Kanji conversion string on which a conversion process is performed by the Kanji converting unit 1 using the dictionary/grammar data base 4. A Kanji conversion string refers to one-word string and clause in which input phonetic characters are converted into Kanji. The clause may be two-word strings such as "従来" (jurai) and "の" (no). The control symbol can be represented by a heading or tailing phonetic character or an accented phonetic character in a Kanji conversion string, a part name of Kanji, the number of strokes of Kanji, and the number of Kanji contained in the present Kanji conversion string.

A control symbol storage unit 6 stores the control symbol generated by the control symbol adding unit 5 corresponding to the Kanji conversion string stored in the document storage unit 2.

A display control unit 7 displays a document stored in the document storage unit 2, and a control symbol stored in the control symbol storage unit 6 for each Kanji conversion string in the document.

Then, an amendment input unit 8 receives from a user a pair of a control symbol of a Kanji conversion string to be amended and a function key practically indicating an amendment. The type of amendment specified by a function key can be a division and integration of Kanji conversion strings, a presentation of the next Kanji candidate group for a Kanji contained in a Kanji conversion string, and a reentry of a Kanji conversion string.

If an amendment is made by the amendment input unit 8, an amending unit 9 determines a Kanji conversion string to be amended from an input control symbol, also determines the type of amendment from the kind of function key, and performs an amendment in accordance with the specified type of amendment.

Described below is the operation shown in the block diagram in FIG. 2.

The user enters phonetic characters through an input device such as a key board, etc.. The Kanji converting unit 1 analyzes the input phonetic characters both morphologically and syntactically using the dictionary/grammar data base 4, divides them into desired Kanji conversion strings, converts them into Kanji, and stores them in the Kanji conversion strings in the document storage unit 2.

At this time, the control symbol adding unit 5 obtains from the Kanji converting unit 1 the division information about the Kanji conversion string to generate a control symbol of the Kanji conversion string. For example, if the control symbol is the heading phonetic character of a Kanji conversion string, then the control symbol adding unit 5 obtains the heading phonetic character together with the division information of the Kanji conversion string from the Kanji converting unit 1. If an accented phonetic character is used as a control symbol, then accent information about the Kanji conversion string is searched for in the dictionary/grammar data base 4. Furthermore, if a part name of Kanji or the number of strokes of Kanji is used as a control symbol, then the heading or the tailing Kanji in the Kanji conversion string is obtained from the Kanji converting unit 1, and the part name or the number of strokes of the Kanji is obtained by searching the dictionary/grammar data base 4. If the number of Kanji characters in a Kanji conversion string is used, then the number of Kanji characters is obtained by receiving Kanji information from the Kanji converting unit 1.

After generating a control symbol as described above, the control symbol adding unit 5 transmits the generated control symbol to the control symbol storage unit 6.

Upon receipt of a control symbol for each Kanji conversion string from the control symbol adding unit 5, the control symbol storage unit 6 stores the control symbol for a Kanji conversion result of each Kanji conversion string stored in the document storage unit 2 ("従来の" (juraino), "技術" (gijutsu), "説明" (setsumei), etc. shown in FIG. 2). In FIG. 2, the first character of the Roman representation of each Kanji conversion string is determined to be a control symbol and stored as "j", "g", and "s".

If Kanji conversion results of predetermined Kanji conversion strings and control symbols are stored respectively in the document storage unit and the control symbol storage unit 6, then the display unit 7 is activated, the Kanji conversion results are read from the document storage unit 2 in Kanji conversion strings, and control symbols for the Kanji conversion strings are read from the control symbol storage unit 6 and displayed on the display 3. At this time, the words in the Kanji conversion strings correspond to the control symbols for display, for example, "従来の技術説明" (juraino gijutsu setsumei).

If the user wants to amend input words, then the user inputs through the amendment input unit 8 a control symbol for the Kanji conversion string to be amended and a function key indicating the type of amendment. For example, if the user wants to replace the Kanji conversion string "説明" (setsumei) with another word, then he or she presses "s" and the function key for reentry.

If the amendment input unit 8 enters any amendment input, the amending unit 9 is activated.

The amending unit 9 determines a Kanji conversion string to be amended by a control symbol, and also determines the type of amendment through an input function key. If the type of amendment indicates a division of a Kanji conversion string, then it requests the Kanji converting unit 1 to further divide the present Kanji conversion string and convert each of the divided Kanji conversion strings into Kanji. If the type of amendment indicates an integration of Kanji conversion strings, then it requests the Kanji converting unit 1 to integrate a Kanji conversion string with the following Kanji conversion string if they can be practically integrated for conversion into Kanji. If the type of amendment indicates a presentation of another candidate Kanji group, then it requests the Kanji converting unit 1 to obtain the next candidate Kanji group. If the type of amendment indicates a reentry of the specified Kanji conversion string, then the amending unit 9 requests the Kanji converting unit 1 to convert the reentered Kanji conversion string into Kanji.

The Kanji converting unit 1 amends words at a request of the amending unit 9. If the words have been amended, the contents of the document storage unit 2 are rewritten and the control symbol adding unit 5 is activated to generate a control symbol for the amended Kanji conversion string as described above, and transmit it to the control symbol storage unit 6. The control symbol storage unit 6 stores an input control symbol at the amended Kanji conversion string.

Figure 3:
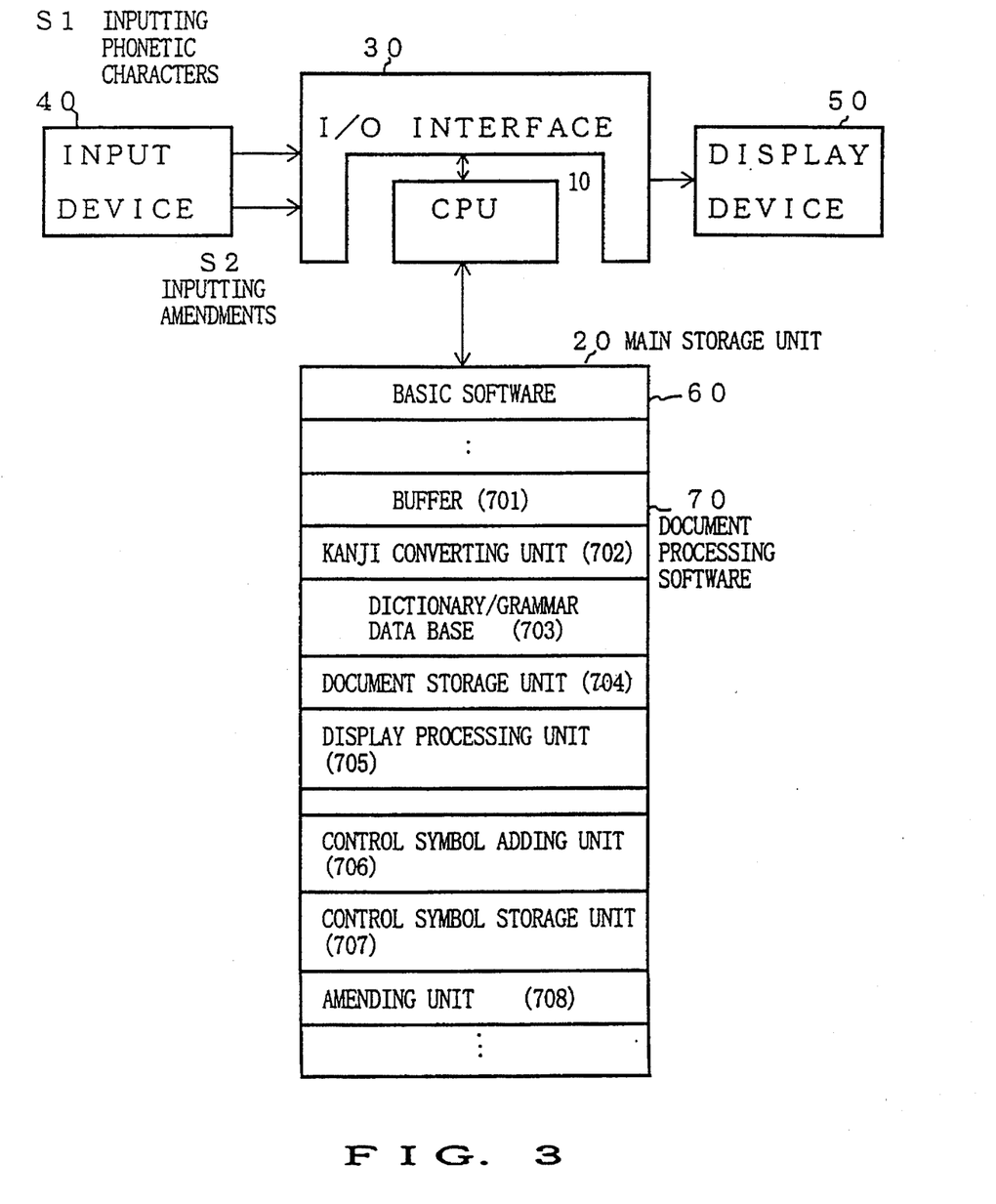
FIG. 3 shows the configuration of the system according to the optimum embodiment.

FIG. 3 shows the configuration of the system according to the embodiment of the present invention.

The present embodiment can be designed as a document processing software for a computer system such as a personal computer, a work station, etc. or for a word processor for processing documents exclusively.

A computer system or the hardware of a word processor to be used with the present invention comprises a CPU 10, a main storage unit 20 connected to the CPU 10, an I/O interface 30 also connected to the CPU 10, an input device 40 such as a key board, etc. connected to the I/O interface 30, and a display device 50 such as a display unit, etc. also connected to the I/O interface 30. The main storage unit 20 is generally provided with a basic software 60, for example, an operating system under which an application software such as a document processing software is operated.

The main storage unit 20 stores the document processing software 70. A conventional Kanji receivable document processing software comprises a buffer 701 for temporarily storing phonetic characters input through the input device 40, a Kanji converting unit 702 for converting input phonetic characters into Kanji, a dictionary/grammar data base 703 for use in a process of the Kanji converting unit 702, a document storage unit 704 for storing a document as a result of a Kanji conversion result, a display processing unit 705 for sending to the display device 50 the display objects, that is, the phonetic character string stored in the buffer 701 and converted Kanji. In this example, the Kanji converting unit 702 can convert a plurality of Kanji conversion strings into Kanji simultaneously in the multiple-word conversion method.

The Kanji conversion result amending system according to the present embodiment is based on the above described configuration and further comprises a control symbol adding unit 706, a control symbol storage unit 707, and an amending unit 708. It is realized as software in the main storage 20.

The control symbol adding unit 706 is activated when phonetic characters input by a user through the input device 40 and stored in the buffer 701 are divided into one or more Kanji conversion strings to be converted into Kanji. Then the control symbol adding unit 706 generates a control symbol for each Kanji conversion string.

The control symbol storage unit 707 is a storage area for storing a control symbol generated by the control symbol adding unit 706, and stores the control symbol corresponding to a Kanji conversion string which has been processed by the Kanji converting unit 702 and stored in the document storage unit 704. For example, assuming that Kanji conversion results are stored sequentially from the first Kanji conversion string from the heading address of the document storage unit 704, the control symbol storage unit 707 stores control symbols sequentially from the control symbol for the first Kanji conversion string at the heading address. Another configuration of the control symbol storage unit 707 is designed such that a control symbol is added as a piece of information about each Kanji conversion string stored in the document storage unit 704.

On the other hand, the display processing unit 705 also used in the conventional document processing software 70 sends to the display device 50 a control symbol stored corresponding to each Kanji conversion string which has been processed by the Kanji converting unit 1, and the Kanji conversion result of each Kanji conversion string is displayed corresponding to its control symbol.

The amending unit 708 is activated when the user inputs phonetic characters in step S2 in response to a Kanji conversion result. Then, it determines a Kanji conversion string to be amended according to the control symbol entered by the user, also determines the type of amendment according to the function key input by the user, and outputs to the Kanji converting unit 702 an amendment request in accordance with the type of amendment. For example, if the type of amendment indicates a division or an integration of Kanji conversion strings, then it instructs the Kanji converting unit 702 to change a Kanji conversion string or to integrate it with the succeeding unit. If the type of amendment indicates a reentry, then it instructs the Kanji converting unit 702 to replace a Kanji conversion string to be amended with a user's reentry for conversion into Kanji. If the type of amendment indicates a change to the next candidate Kanji having the same pronunciation as the present Kanji and a different meaning from it, then the amending unit 708 changes the Kanji conversion string to be amended to the next candidate.

The above described system configuration is described below.

The user inputs the phonetic characters through the input device 40 (inputting phonetic characters in step S1). The input phonetic characters S1 are stored in the buffers 701 in the main storage 20 through the I/O interface 30. The Kanji converting unit 702 divides the stored phonetic characters into one or more Kanji conversion strings using the dictionary/grammar data base 703, and then converts them into Kanji. A conversion result is stored in the document storage unit 704 for each Kanji conversion string.

At this time, the control symbol adding unit 706 is activated and generates a control symbol for each Kanji conversion string divided by the Kanji converting unit 702.

The control symbol generated by the control symbol adding unit 706 is stored in the control symbol storing unit 707 corresponding to a Kanji conversion result for each Kanji conversion string stored in the document storing unit 704.

When input phonetic characters S1 are stored in the buffer 701, the display processing unit 705 sends a phonetic character string to the display device 50 so that the input phonetic characters can be successfully displayed. If a Kanji conversion result corresponding to the phonetic character string and a control symbol are stored respectively in the document storage unit 704 and the control symbol storage unit 707, then a Kanji conversion resultant string and a control symbol character for each Kanji conversion string are sent in a pair to the display device 50 and the control symbol and the Kanji conversion result are displayed in a pair.

The user views the Kanji conversion result and the control symbol displayed on the display device 50, and, if acceptable, enters the next phonetic characters through the input device 40. However, if the resultant Kanji conversion result should be amended, then amendment input S2 is input through the input device 40.

Amendment input S2 is, for example, a combination of a control symbol for identifying a Kanji conversion string to be amended and a function key indicating the type of amendment to be entered simultaneously.

Upon receipt of amendment input S2, the amending unit 708 is activated, determines according to the control symbol a Kanji conversion string to be amended, and then determines the type of amendment according to the function key. Then, it issues an amendment request depending on the type of amendment to the Kanji converting unit 702. For example, if the type of amendment indicates a division or an integration of Kanji conversion strings, then it instructs the Kanji converting unit 702 to change a Kanji conversion string or to integrate it with the succeeding unit. If the type of amendment indicates a reentry, then it instructs the Kanji converting unit 702 to replace a Kanji conversion string to be amended with a user's reentry for conversion into Kanji. If the type of amendment indicates a change to the next candidate Kanji having the same pronunciation as the present Kanji and a different meaning from it, then the amending unit 708 instructs to change the Kanji conversion string to be amended to the next candidate.

If the Kanji converting unit 702 has performed its process at an instruction from the amending unit 708, then a Kanji conversion result is stored in the document storage unit 704, and the control symbol adding unit 706 is activated. Then, a control symbol is generated as described above and stored in the control symbol storage unit 707. The display processing unit 705 reads an amended Kanji conversion string and its control symbol from the document storage unit 704 and the control symbol storage unit 707 respectively, and sends them to the display device 50. Thus, the amendment result is displayed with the control symbol.

With the above described system configuration, input character string can be amended by specifying a Kanji conversion string to be amended without using a cursor positioning key or a cancel key.

Figure 4:
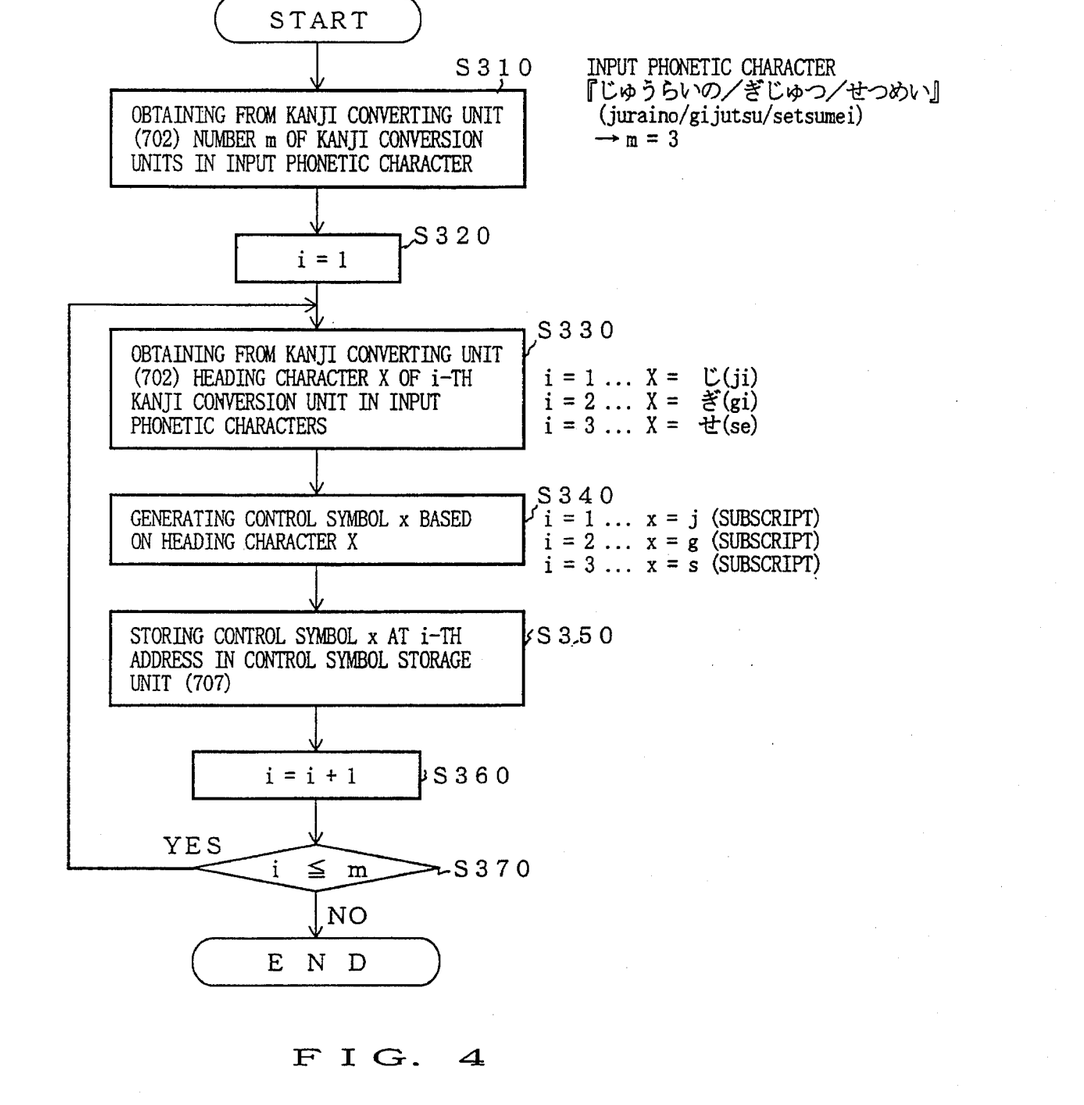
FIG. 4 is the operational flowchart of the control symbol adding unit according to the optimum embodiment (only the initial sound of each Kanji conversion string is a control symbol)

FIG. 4 is the flowchart showing the operation of the control symbol adding unit 706 according to the embodiment of the present invention. In the present embodiment, the heading phonetic character of each Kanji conversion string can be a control symbol and is represented as an alphabetical subscript.

The control symbol adding unit 706 is not activated until phonetic characters (S1) input by a user and stored in the buffer 701 have been divided into Kanji conversion strings by the Kanji converting unit 702 using the dictionary/grammar data base 703. The control symbol adding unit 706 instructs the Kanji converting unit 702 to send the number of Kanji conversion strings in the input phonetic characters. The returned number of Kanji conversion strings is m (step S310). If the user enters "じゅうらいのぎじゅつせつめい" (jurainogijutsusetsumei) using phonetic characters, then the Kanji converting unit 702 divides them into Kanji conversion strings and should obtain three Kanji conversion strings "じゅうらいの" (juraino), "ぎじゅつ" (gijutsu), and "つせつめい" (setsumei). Then, the control symbol adding unit 706 obtains m=3.

Next, a Kanji conversion string number i indicating variable, that is, an order of each Kanji conversion string, is set to 1 (step S 320) and the following control symbol generating process is entered.

First, the Kanji converting unit 702 is instructed to send the heading character X of the i-th Kanji conversion string (step S 330). In this example, X is the heading character "じ" (ji) of the first Kanji conversion string.

Then, control symbol x is generated based on the heading character X (step S 340). According to the present embodiment, the control symbol is represented by an alphabetical subscript. Accordingly, control symbol x is "j" as a subscript of the first character j of Roman characters "ji" of the phonetic character "じ".

In Chinese, phonetic characters are alphabets, and control symbol x can be obtained by getting as a subscript the heading character X of the Kanji conversion string from the Kanji converting unit 702.

The obtained control symbol x is stored at the i-th address of the control symbol storage unit 707 corresponding to the Kanji conversion string number i. In the present example, it is stored in the first address (step S 350). The control symbol storage unit 707 stores the character code of control symbol x. Thus, a control symbol of a Kanji conversion string is obtained and stored.

The Kanji conversion string number i is incremented by 1 to process the next Kanji conversion string (step S 360). If the Kanji conversion string number i is smaller than the number m of Kanji conversion strings (yes in step S 370), control is returned to step S 330 and control symbol x of the i-th Kanji conversion string is obtained. The process terminates if control symbols of all Kanji conversion strings have been generated (no in step S 370).

As described above, when the phonetic characters "じゅうらいのぎじゅつせつめい" (jurainogijutsusetsumei) are entered, control symbol j of the first Kanji conversion string, control symbol g of the second Kanji conversion string, and control symbol s of the third Kanji conversion string are generated and stored in the first through the third address in the control symbol storage unit 707 respectively.

Figure 5:
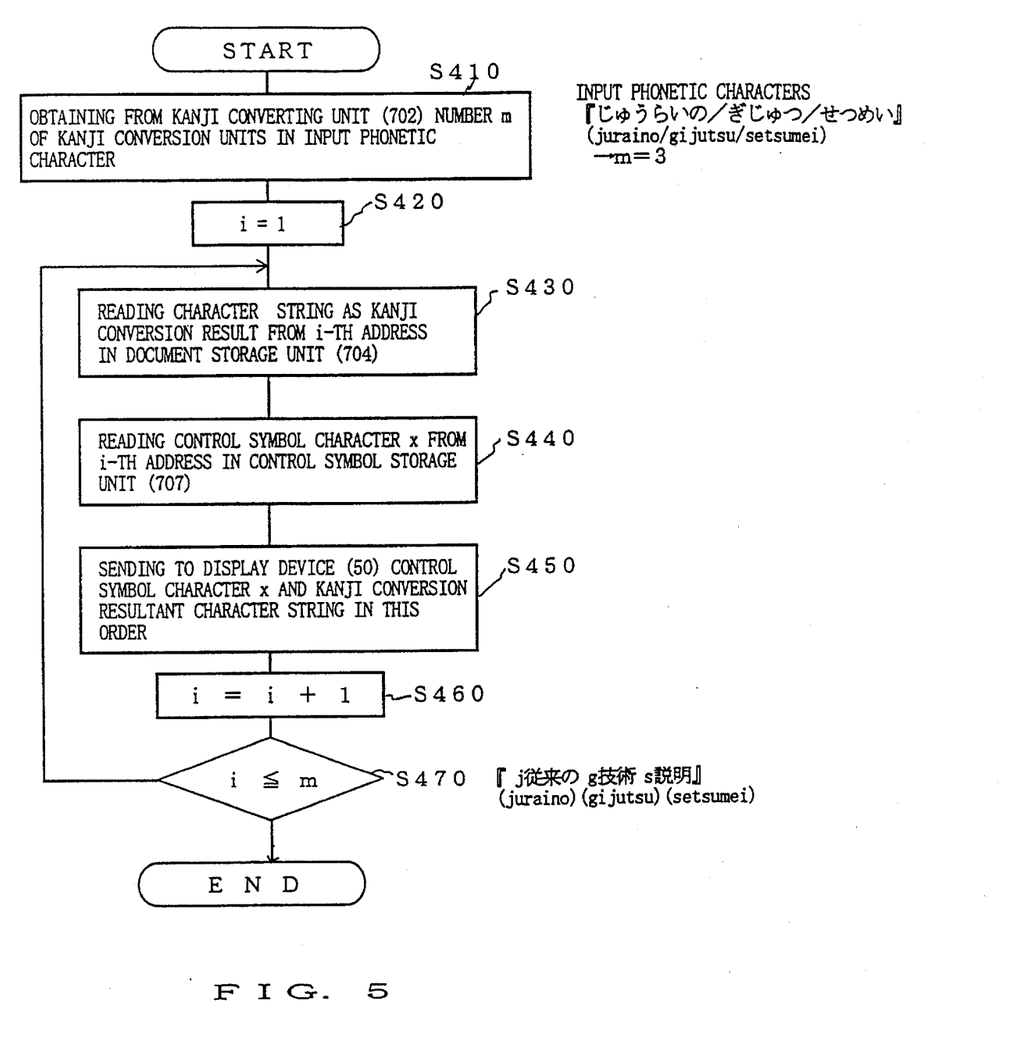
FIG. 5 is the operational flowchart of the display processing unit according to the optimum embodiment.

FIG. 5 is the flowchart showing the operation of the display processing unit 705 according to an embodiment of the present invention. The display processing unit 705 obtains an input phonetic character string when it stores user-input phonetic characters (S1) in the buffer 701, and displays the phonetic characters (S1) on the display device 50. If the processes of the Kanji converting units 702 and the control symbol adding unit 706 have been completed, then a Kanji conversion result and a control symbol are displayed. The input phonetic characters are not displayed according to the flowchart of the operation shown in FIG. 5. Displayed are Kanji conversion results and control symbols only.

First, the number m of Kanji conversion strings in input phonetic characters is obtained from the Kanji converting unit 702 (S410). Then, the displaying process is started with the Kanji conversion string number i set to 1 (step S 420).

First, a character string is read as a Kanji conversion result from the i-th address (the first address corresponding to the Kanji conversion string number i in the document storage unit 704 (step S 430). If the input phonetic characters are "じゅうらいのぎじゅつせつめい" (jurainogijutsusetsumei), then a character code string of "従来の" (juraino) is obtained as a result of the Kanji conversion of the first Kanji conversion string.

Second, control symbol x is read from the i-th address (the first address in this example) corresponding to the Kanji conversion string number i in the control symbol storage unit 707 (S440). In this example, the character code "j" is obtained.

Then, the character code strings of control symbol character x and a Kanji conversion result are sent to the display device 50 in this order (S450). As a result, "j 従来の" (juraino) is displayed on the display device 50. Thus, one Kanji conversion string is successfully displayed.

Then, the Kanji conversion string number i is incremented by 1 to process the next Kanji conversion string (step S 460). If the Kanji conversion string number i is smaller than the number m of Kanji conversion strings (yes in step S 470), control is returned to step S 430 and the next Kanji conversion string is processed for display. The process terminates if the last Kanji conversion string has been displayed (no in step S 470).

As described above, the Kanji conversion for the input phonetic characters "じゅうらいのぎじゅつせつめい" (jurainogijutsusetsumei) outputs "j従来の g技術 s説明" (juraino gijutsu setsumei) displayed on the display device 50.

Figure 6:
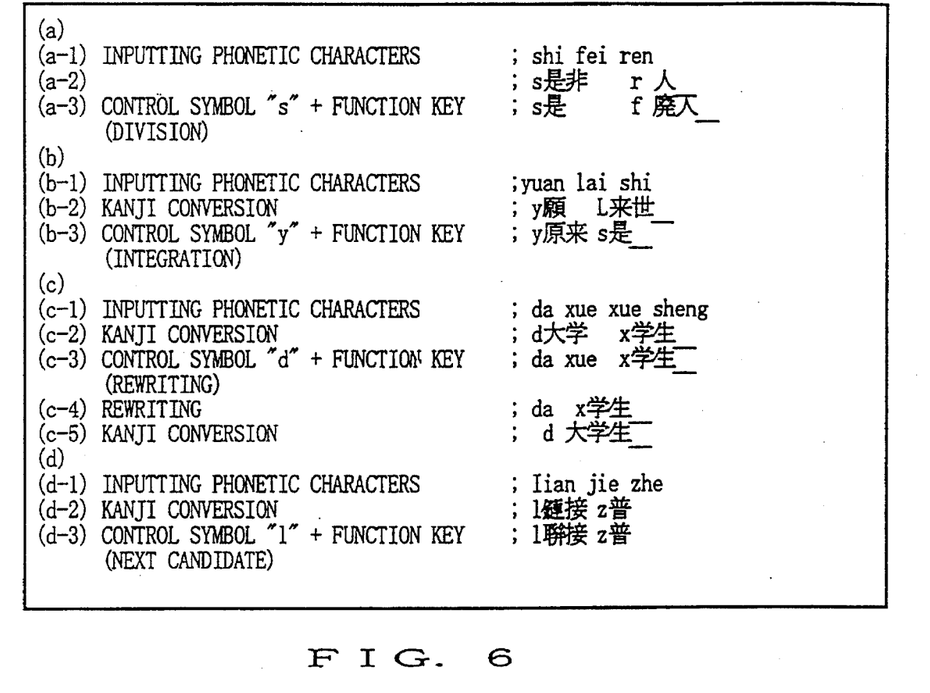
FIG. 6 shows an example of a process for a Chinese conversion system.

FIG. 6 shows examples of Chinese processed based on the present embodiment. Four examples (a) through (d) are displayed here. According to the operational flowcharts of the control symbol adding unit 706 and the display processing unit 705, (a) through (d) in FIG. 6 indicate the input phonetic characters (a-1, b-1, c-1, and d-1), Kanji conversion results, and control symbols (a-2. b-2, c-2, and d-2) displayed on the display device 50.

That is, when a user enters phonetic characters "shifeiren" (a-1) in FIG. 6, the system divides them into conversion units "shifei ren", converts them into Chinese characters, assigns them control symbols, and obtains "s是非 r人" ((a-2) in FIG. 6). In Chinese, phonetic characters are alphabetical letters and therefore a control symbol is the first alphabetical letters of the input phonetic characters of each conversion unit.

Likewise, the phonetic characters "yuanlaishi" are divided into two conversion units "yuan laishi", and converted into Chinese characters and assigned generated control symbols as "y原 l来世" ((b-1, b-2) in FIG. 6). The phonetic characters "daxuexuesheng" are divided into "daxue xuesheng" and converted into "d大学 x学生" ((c-1, c-2) in FIG. 6). The phonetic characters "lianjiezhe" are converted into "lianjie zhe" and converted into "l学生 z者" as a result of the character conversion and the generation of a control symbol ((d-1, d-2) in FIG. 6).

The user views the display of the control symbols and the conversion results in pairs to determine whether or not amendments are required. If no amendments are required, then the next phonetic characters are input through the input device 40. Thus, conversion results are fixed, the display device stops displaying the control symbols, and "従来の技術説明" (juraino gijutsu setsumei) is displayed.

If amendments are required, then the user enters through the input device 40 the control symbol of a Kanji conversion string to be amended and a function key indicating the type of amendment. The types of amendments are, for example, a division or integration of Kanji conversion strings, a reentry of a Kanji conversion string, a request for the next candidate of Kanji in a Kanji conversion string, etc. If a word processor can convert input characters into Kanji, the key board is normally provided with a function key for selecting the next candidate, but does not have a function key indicating the type of amendment such as a division, integration, reentry, etc. Therefore, the system should be designed by assigning amendment keys. For example, a type of amendment can be specified by simultaneously pressing two specific keys such as a shift key, a CTRL key, an ALT key, etc.

Figure 7:
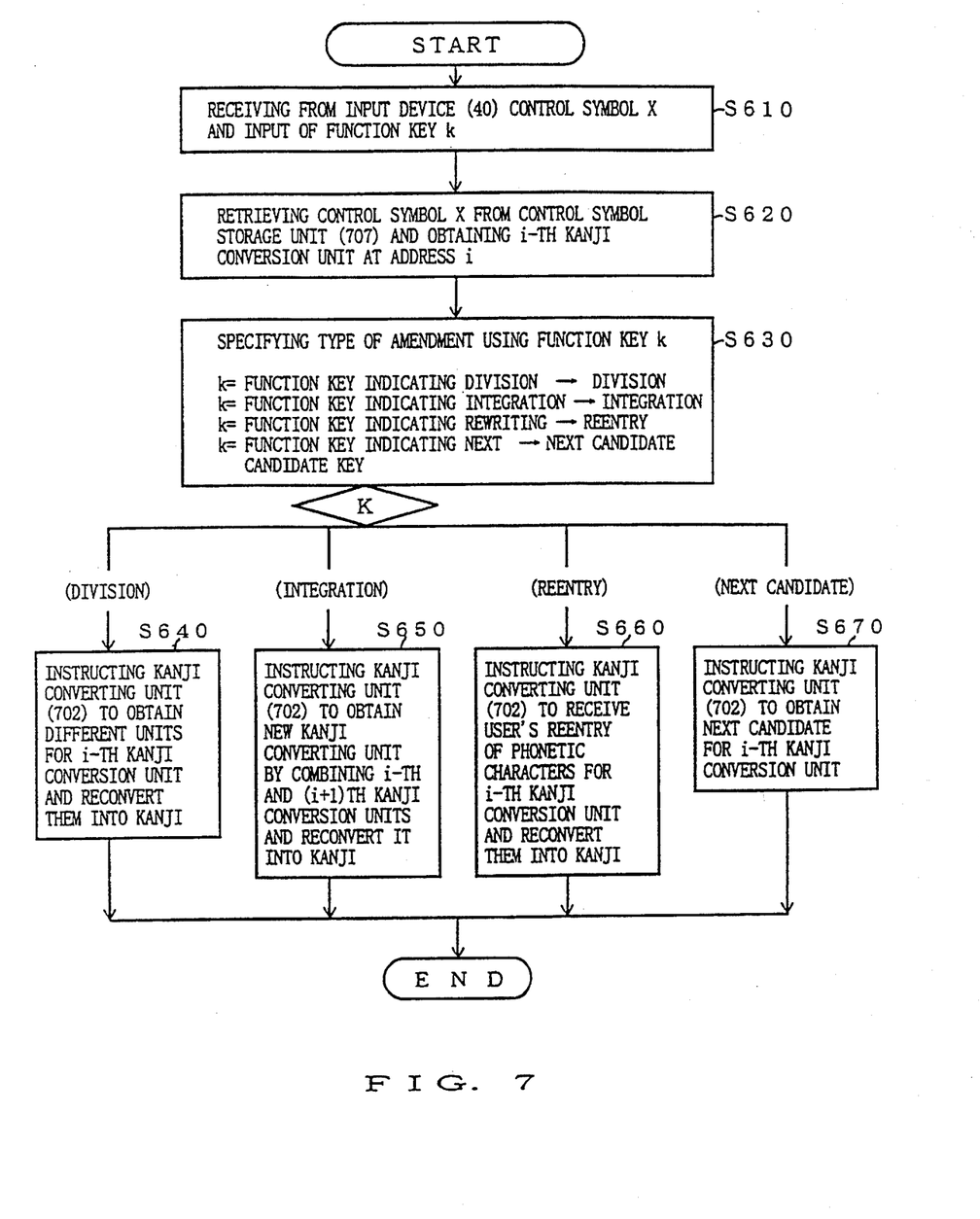
FIG. 7 is the operational flowchart of the amending unit according to the optimum embodiment.

FIG. 7 is the flowchart showing the operation of the amending unit 708 according to the embodiment of the present invention.

First, a user-input control symbol and a function key are obtained from the input device 40 and labeled with x and K respectively (step S 610). Then, control symbol x is retrieved from the control symbol storage unit 707 to obtain the sequence of Kanji conversion strings at the address where control symbol x is stored (step S 620). That is, if control symbol x is stored in the i-th address, then the i-th Kanji conversion string can be considered to be amended. Furthermore, function key K determines the type of amendment (step S 630). The correspondence between the type of function key and the type of amendment is preliminarily determined. The type of amendment can be a division, integration, and reentry of a Kanji conversion string, and an obtaining of the next candidate of Kanji. Other types of amendment can be considered.

If the type of amendment refers to a division of a Kanji conversion string, then the amending unit 708 requests the Kanji converting unit 702 to divide the i-th Kanji conversion string into another segmentation for conversion (step S 640). Thus, the Kanji converting unit 702 further divides the i-th Kanji conversion string, and the new Kanji conversion strings are converted into Kanji.

On the other hand, if the type of amendment refers to an integration of Kanji conversion strings, then the amending unit 708 requests the Kanji converting unit 702 to obtain the i-th and (i+1)th Kanji conversion strings for conversion into Kanji (step S 650). The Kanji converting unit 702 performs a requested process.

If the type of amendment refers to a reentry, then the amending unit 708 requests the Kanji converting unit 702 to position the cursor at the head of the i-th Kanji conversion string and clear the present Kanji conversion result of the i-th Kanji conversion string (step S 660). Thus, the display processing unit 705 displays the input phonetic characters for the i-th Kanji conversion string in the buffer 701. When the user enters new phonetic characters (S1) and they are stored at the i-th Kanji conversion string in the buffer 701, the display processing unit 705 displays the reentered phonetic characters. The Kanji converting unit 702 converts into Kanji the input phonetic characters stored at the i-th Kanji conversion string in the buffer 701.

If the type of amendment refers to a selection of the next candidate of Kanji, then the amending unit 708 requests the Kanji converting unit 702 to output the next candidate of Kanji in the i-th Kanji conversion string (step S 670). Thus, the Kanji converting unit 702 selects the next candidate of Kanji.

If each of the above described amendment requests has been completed, then the amending unit 708 terminates the process.

If the type of amendment refers to a division and integration of Kanji conversion strings, then the Kanji conversion string is subject to a change in segmentation, and a control symbol is also changed. Therefore, the control signal adding unit 706 generates a new control symbol when a Kanji conversion string indicates a change. The flowchart showing the operation shown in FIG. 4 is operated again to generate a new control symbol.

FIG. 6 (a-3) shows an example in which a Kanji conversion string is further divided into a plurality of conversion units. In this example, the first Kanji conversion string "是非" of the first Kanji conversion result "s是非 r人" should be divided differently. The user enters control symbol s indicating the first Kanji conversion string and a function key indicating a division of a Kanji conversion string. Thus, the amending unit 708 requests the Kanji converting unit 702 to change the division of the first Kanji conversion string. As a result, the Kanji converting unit 702 divides the first Kanji conversion string to perform a Kanji conversion for the first Kanji conversion string "shi" and the second Kanji conversion string "fei ren", and the control symbol adding unit 706 generates a new control symbol to obtain a conversion result "s是 f廃人" shown in FIG. 6 (a-3).

FIG. 6 (b-3) shows an example in which a plurality of Kanji conversion strings are integrated into a single conversion unit. In this example, the first Kanji conversion string "願" of the first Kanji conversion result "y願 l来世" should be integrated with the next Kanji conversion string. The user enters control symbol y indicating the first Kanji conversion string and a function key indicating an integration of Kanji conversion strings. Thus, the amending unit 708 requests the Kanji converting unit 702 to integrate the first and the second Kanji conversion strings for reconversion. As a result, the Kanji converting unit 702 obtains a new Kanji conversion strings "yuanlai shi" and converts them into Kanji, and the control symbol adding unit 706 generates a new control symbol to obtain a conversion result "y原来 s是" shown in FIG. 6 (b-3).

FIG. 6 (c-3 through c-5) shows an example in which a Kanji conversion string is reentered using phonetic characters. In this example, the first Kanji conversion string "大学" of the first Kanji conversion result "d大学 x学生" should be reentered. The user enters control symbol d indicating the first Kanji conversion string and a function key indicating a reentry of a Kanji conversion string. Thus, the amending unit 708 requests the Kanji converting unit 702 to clear the first Kanji conversion result of the first Kanji conversion string. As a result, the first Kanji conversion string is returned to the first input phonetic characters "daxue" (FIG. 6 (c-3)). If the user enters a new input phonetic characters "da", then the characters are displayed (FIG. 6 (c-4)). Upon receipt of the input phonetic characters, the Kanji converting unit 702 redivides the Kanji conversion strings, obtains "daxuesheng" as a single Kanji conversion string, and converts it into Kanji. Then, the control symbol adding unit 706 generates a new control symbol, and obtains a conversion result "d大学生" shown in FIG. 6 (c-5).

FIG. 6 (d-3) shows the last example in which a next Kanji candidate is selected. In this example, the first Kanji conversion string "鍵桙" of the first Kanji conversion result "l鍵桙 z著" should be replaced with other Kanji. The user enters control symbol l indicating the first Kanji conversion string and a function key indicating the next Kanji candidate. Thus, the amending unit 708 requests the Kanji converting unit 702 to replace the Kanji of the first Kanji conversion string with the next Kanji candidate. As a result, the Kanji converting unit 702 obtains the next Kanji candidate, and the control symbol adding unit 706 generates a new control symbol and outputs the Kanji conversion result "l邦接 z著" shown in FIG. 6 (d-3).

Figure 8:
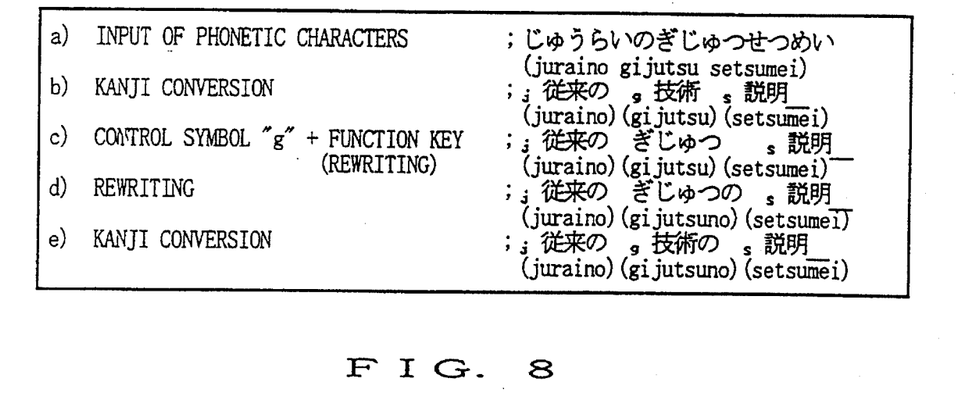
FIG. 8 shows an example of a process of converting phonetic characters into Kanji.

FIG. 8 shows the process of amending a Kanji conversion according to the present invention as compared with the conventional conversion method shown in FIG. 1.

The user first enters phonetic characters "じゅうらいのぎじゅつせつめい" (jurainogijutsusetsumei) as shown in FIG. 8A. The Kanji converting unit 702 divides them into a plurality of Kanji conversion strings and converts them into Kanji. Then, the control symbol adding unit 706 generates a control symbol and outputs the conversion result "j従来の g技術 s説明" as shown in FIG. 8B.

If the second Kanji conversion string "技術" (gijutsu) should be amended to "技術の" (gijutsuno), then the user enters control symbol g indicating the second Kanji conversion string and a function key indicating a reentry. The amending unit 706 requests the Kanji converting unit 702 to reenter the second Kanji conversion string. As a result, the Kanji converting unit 702 clears the conversion result of the second Kanji conversion string and returns the conversion to the initial input phonetic characters "ぎじゅつ" (gijutsu) as shown in FIG. 8C. Since the user wants to change the phonetic characters to "ぎじゅつの" (gijutsuno), he or she moves the cursor at the next position of "ぎじゅつ" (gijutsu), presses an insert key followed by a space and a "の" (no). Thus, the character is added to the end of the second Kanji conversion string (FIG. 8D). Then, the Kanji converting unit 702 divides the reentered phonetic characters and converts them into Kanji. The control symbol adding unit 706 generates a control symbol and outputs "j 従来の g 技術の s 説明" as shown in FIG. 8E.

As described above, the present invention has to only enter g to specify an amendment object and a function key indicating a reentry when a converted words should be amended, thereby requiring only two presses, that is, half the conventional four presses.

Thus, according to the present invention, the converted Kanji can be amended by a smaller number of presses, and the inputting operation can be greatly sped up.

When an accented phonetic character, a Kanji parts name, the number of Kanji characters, or the number of strokes of a Kanji character is used as a control symbol, the control symbol can be added in the same manner as in the case of the initial phonetic character. When an initial sound is used to specify the head of a word, a control symbol can be immediately generated by referring to the buffer 701 because an entry is made using phonetic characters. However, additional steps should be added if an accented phonetic character, Kanji character parts name, or the number of Kanji characters should be represented.

That is, the dictionary/grammar data base 703 preliminarily stores accented phonetic characters, parts names of Kanji characters, or numbers of strokes of Kanji characters. When a Kanji conversion string or a Kanji character is obtained by the Kanji conversion block 702, an accented phonetic character in a Kanji conversion string or a parts name or the number of strokes of a Kanji character is read from the dictionary/grammar data base 703, converted into a symbol, and then stored in the control symbol storing unit 707. When the number of Kanji characters in a Kanji conversion string is represented as a control symbol, the number of Kanji characters in a Kanji conversion result is counted when the conversion is completed by the Kanji converting unit 702, and the count value is stored as a control symbol in the control symbol storing unit 707.

As described above, a plurality of Kanji conversion strings can be assigned the same control symbol when the control symbol is represented by any of an accented phonetic character, Kanji parts name, number of strokes of a Kanji character, or number of characters. In such a case, other control symbols may be used. That is, a combination of an accented phonetic character and a parts name, or a combination of a first and second heading characters can be used. Otherwise a first and a second phonetic characters can be used as a control symbol. Thus, even if there are a plurality of Kanji conversion strings having the same heading character of Kanji conversion strings, the Kanji conversion string of an amendment object can be determined by a control symbol.

When phonetic characters "じゅうらいのじゅうようなぎじゅつ" (jurainojuyonagijutsu) are entered, a conversion result "j 従来の j 重要な g 技術" is displayed if control symbols are represented by initial sounds of Kanji conversion strings. In this case, the first and second Kanji conversion strings cannot be distinguished from each other because they have the same control symbol j. Then, the second Kanji conversion string is represented by another symbol, for example "j 従来の ¥ 重要な g 技術". As a result, the first Kanji conversion string can be clearly distinguished from the second Kanji conversion string.

Since the present invention determines a Kanji conversion string of an amendment object using a control symbol, there is no need of pressing a cursor key and function key a number of times, thereby reducing the number of presses of keys in amending a conversion result. Thus, an inputting operation for amending the conversion result can be greatly speed up and a Kanji conversion result can be efficiently amended.

What is claimed is:

1. A Kanji (Chinese characters) conversion result amending system comprising:

a dictionary/grammar data base means for accumulating a dictionary and a grammar;

Kanji converting means for converting phonetic characters sequentially input for a plurality of Kanji conversion strings into Kanji using the dictionary/grammar data base means;

document storage means for storing converted Kanji as a Kanji conversion result;

means for displaying the converted Kanji;

control symbol adding means for generating a control symbol representing each of said plurality of Kanji conversion strings;

control symbol storage means for storing the control symbol generated by said control symbol adding means in an order of storing the Kanji conversion result in said document storage means;

amendment input means for specifying one of said plurality of Kanji conversion strings to be amended using the control symbol when the Kanji conversion string requires an amendment; and amending means for amending the Kanji conversion string to be amended and specified by said amendment input means.

2. A Kanji (Chinese characters) conversion result amending system comprising:

a dictionary/grammar data base means for accumulating a dictionary and a grammar;

Kanji converting means for converting phonetic characters sequentially input for a plurality of Kanji conversion strings into Kanji using the dictionary/grammar data base means;

document storage means for storing converted Kanji as a Kanji conversion result;

means for displaying the converted Kanji;

control symbol adding means for generating a control symbol representing a Kanji conversion string;

display control means for displaying on the display means the control symbol generated by said control symbol adding means and a Kanji conversion result in a pair;

control symbol storage means for storing the control symbol generated by said control symbol adding means in an order of storing a Kanji conversion result in said document storage means;

amendment input means for specifying a Kanji conversion string to be amended using the control symbol when the Kanji conversion string requires an amendment; and amending means for amending the Kanji conversion string to be amended and specified by said amendment input means.

3. The Kanji conversion result amending system according to claim 2, wherein
said control symbol adding means generates the control symbol using an initial or an ending phonetic character of each Kanji conversion string.

4. The Kanji conversion result amending system according to claim 2, wherein
said control symbol adding means generates the control symbol using an accented phonetic character of each Kanji conversion string.

5. The Kanji conversion result amending system according to claim 2, wherein
said control symbol adding means generates the control symbol using a parts name of a heading or tailing Kanji character of each of the Kanji conversion strings.

6. The Kanji conversion result amending system according to claim 2, wherein
said control symbol adding means generates the control symbol using a number of Kanji characters in each of the Kanji conversion strings.

7. The Kanji conversion result amending system according to claim 2, wherein
said control symbol adding means generates the control symbol using a number of strokes of a heading or tailing Kanji character of each of the Kanji conversion strings.

8. The Kanji conversion result amending system according to claim 2, wherein
said control symbol adding means generates the control symbol representing each of said plurality of Kanji conversion strings by further adding another control symbol when a plurality of Kanji conversion strings are assigned the same generated control symbol.

9. The Kanji conversion result amending system according to claim 2, wherein
said amendment input means enters the control symbol indicating the Kanji conversion string to be amended together with a function key indicating a type of amendment.

10. The Kanji conversion result amending system according to claim 9, wherein
said amendment input means provides a function key indicating the type of amendment, that is, a division, integration, reentry, or presentation of a next candidate.

11. The Kanji conversion result amending system according to claim 10, wherein
said amending means requests said Kanji converting means to further divide a Kanji conversion string specified by said amendment input means using the control symbol and perform again a Kanji converting operation if the type of amendment indicates a division of the Kanji conversion string; requests said Kanji converting means to integrate the Kanji conversion string specified using the control symbol by said amendment input means with another Kanji conversion string and perform again the Kanji converting operation if the type of amendment indicates an integration of Kanji conversion strings; requests said Kanji converting means to clear the Kanji conversion string specified by said amendment input means using the control symbol and perform again the Kanji converting operation on phonetic characters newly input as a Kanji conversion string if the type of amendment indicates a reentry of the Kanji conversion string; and requests said Kanji converting means to replace a present Kanji conversion result of the Kanji conversion string specified by said amendment input means using the control symbol with a next Kanji candidate.

* * * * *